(12) United States Patent  
Ambo et al.

(10) Patent No.: US 11,964,618 B2  
(45) Date of Patent: Apr. 23, 2024

(54) UNDERCOVER STRUCTURE

(71) Applicant: HONDA MOTOR CO., LTD., Tokyo (JP)

(72) Inventors: Kei Ambo, Wako (JP); Kenichi Ando, Wako (JP); Yoshiteru Hoshida, Tokyo (JP); Yuki Nakamura, Wako (JP); Yoji Suwa, Wako (JP); Takumi Sobue, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 344 days.

(21) Appl. No.: 17/383,917

(22) Filed: Jul. 23, 2021

(65) Prior Publication Data  
US 2022/0032859 A1  Feb. 3, 2022

(30) Foreign Application Priority Data

Jul. 28, 2020 (JP) ................................. 2020-127726

(51) Int. Cl.  
*B60R 13/04* (2006.01)  
*B60R 19/00* (2006.01)

(52) U.S. Cl.  
CPC .............. *B60R 13/04* (2013.01); *B60R 19/00* (2013.01); *B60R 2019/002* (2013.01)

(58) Field of Classification Search  
CPC ... B60R 13/04; B60R 19/00; B60R 2019/002; B60R 13/0861; Y02T 10/82; Y02T 10/88; B62D 35/02; B62D 37/02

See application file for complete search history.

(56) References Cited

U.S. PATENT DOCUMENTS

| 4,770,457 A * | 9/1988 | Tomforde ............ B62D 35/005 296/180.5 |
| 5,322,340 A * | 6/1994 | Sato .................. B62D 25/2036 296/180.1 |

(Continued)

FOREIGN PATENT DOCUMENTS

| CN | 109070953 A | * 12/2018 | ............. B62D 35/02 |
| CN | 110816683 A | 2/2020 | |

(Continued)

OTHER PUBLICATIONS

Office Action received in corresponding Japanese application No. 2020-127726 dated Feb. 15, 2022 with English translation (6 pages).

(Continued)

*Primary Examiner* — James A Shriver, II  
*Assistant Examiner* — Michael T. Walsh  
(74) *Attorney, Agent, or Firm* — Rankin, Hill & Clark LLP

(57) ABSTRACT

In an undercover structure according to the present invention, a first cover part that is a lowermost part of an undercover has a first rear end positioned ahead of a front wheel axle. Further, a curved part with a predetermined curvature is formed at the first rear end of the first cover part in a side view. This generates a strong negative pressure in a region ahead of the front wheel axle 21. Accordingly, the flow rate of air flowing to each wheelhouse 23 decreases (the flow rate of the airflow between a road and a vehicle generated along the bottom surface of the first cover part 15*a* of the undercover 15 increases). This causes an attraction force that attracts the vehicle to a road surface to act on a vehicle body of the vehicle, thereby making traveling stability more excellent.

12 Claims, 15 Drawing Sheets

(56) References Cited

U.S. PATENT DOCUMENTS

| | | | | |
|---|---|---|---|---|
| 8,297,685 | B2* | 10/2012 | Wolf | B62D 35/005 296/180.1 |
| 9,932,074 | B2* | 4/2018 | Sarhadiangardabad | B62D 35/02 |
| 10,124,838 | B2* | 11/2018 | Shibutake | B62D 35/02 |
| 11,091,209 | B2* | 8/2021 | Nakagawa | B62D 35/02 |
| 11,731,711 | B2* | 8/2023 | Uno | B62D 35/005 296/180.1 |
| 2019/0202504 | A1* | 7/2019 | Mandl | B62D 37/02 |
| 2020/0047818 | A1 | 2/2020 | Ebisumoto et al. | |
| 2020/0406992 | A1 | 12/2020 | Mandl et al. | |

FOREIGN PATENT DOCUMENTS

| | | | | |
|---|---|---|---|---|
| DE | 4208999 | A1 | | 9/1993 |
| DE | 4208999 | A1 * | 9/1993 | B62D 35/02 |
| DE | 102020008147 | A1 * | 7/2022 | |
| EP | 3300995 | A1 * | 4/2018 | B60K 11/06 |
| JP | 2009-220689 | A | 10/2009 | |
| JP | 2009220689 | A * | 10/2009 | |
| JP | 2010-076485 | A | 4/2010 | |
| JP | 2010076485 | A * | 4/2010 | |
| JP | 2019059308 | A * | 4/2019 | |
| KR | 101524717 | B1 * | 6/2015 | |
| WO | WO-2011126084 | A1 * | 10/2011 | B62D 35/02 |
| WO | 2017199231 | A1 | 11/2017 | |
| WO | WO-2017199231 | A1 * | 11/2017 | B62D 35/02 |

OTHER PUBLICATIONS

English abstract of Chinese Office Action received in corresponding Chinese application No. 202110804829.7 dated Aug. 26, 2023 (1 page).

Chinese Office Action dated Aug. 26, 2023 issued in corresponding Chinese application No. 202110804829.7 (7 pages).

* cited by examiner

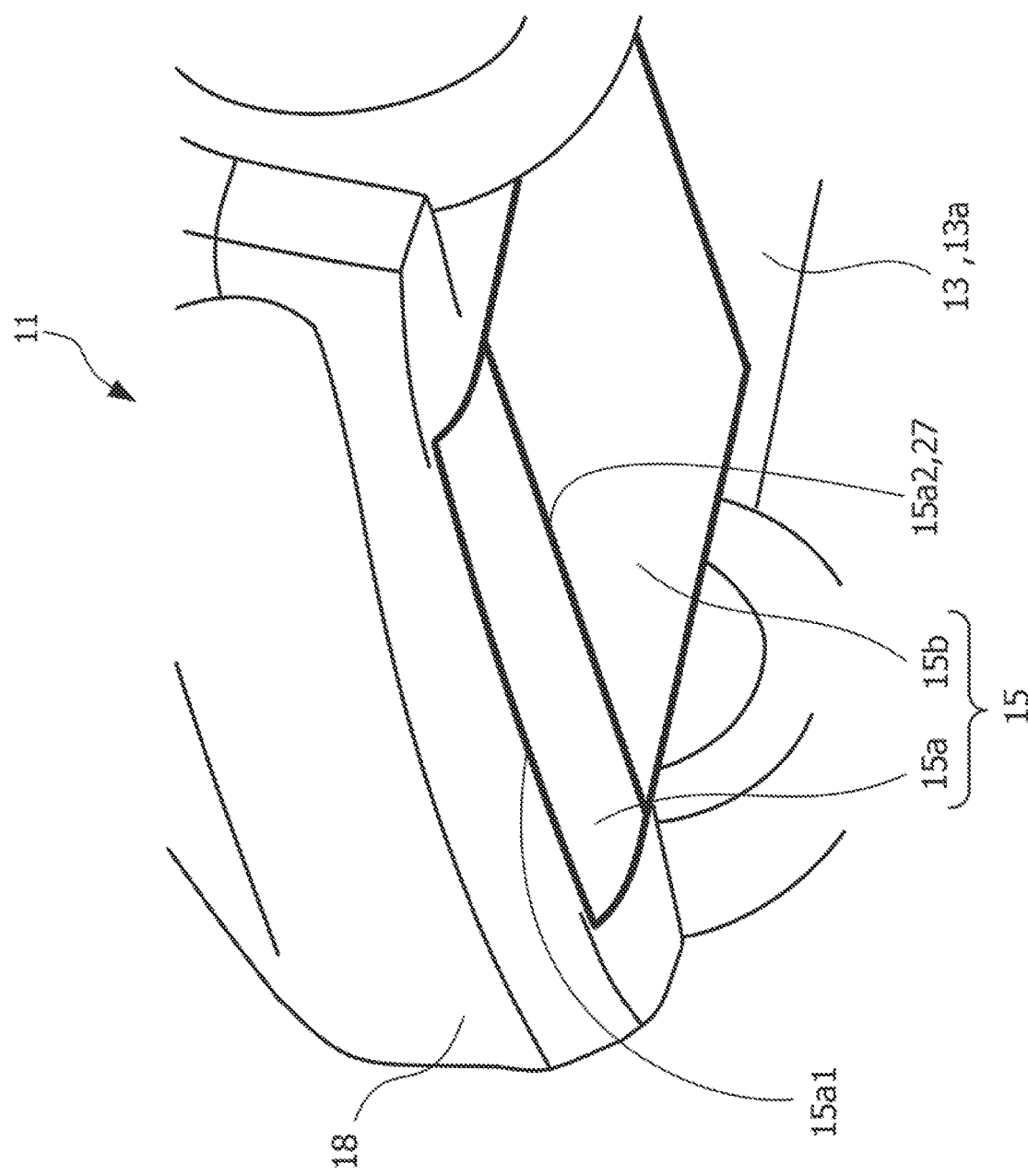

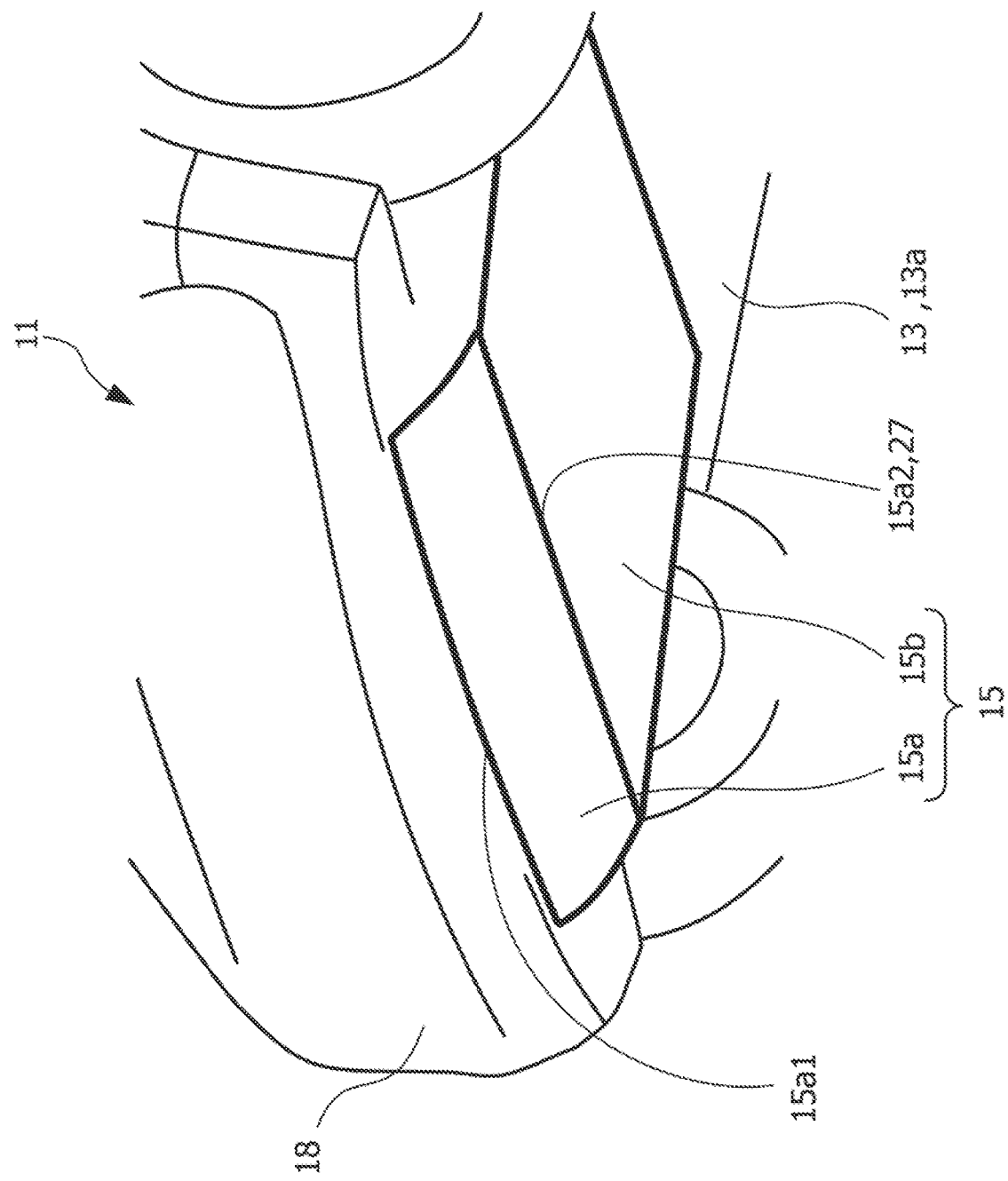

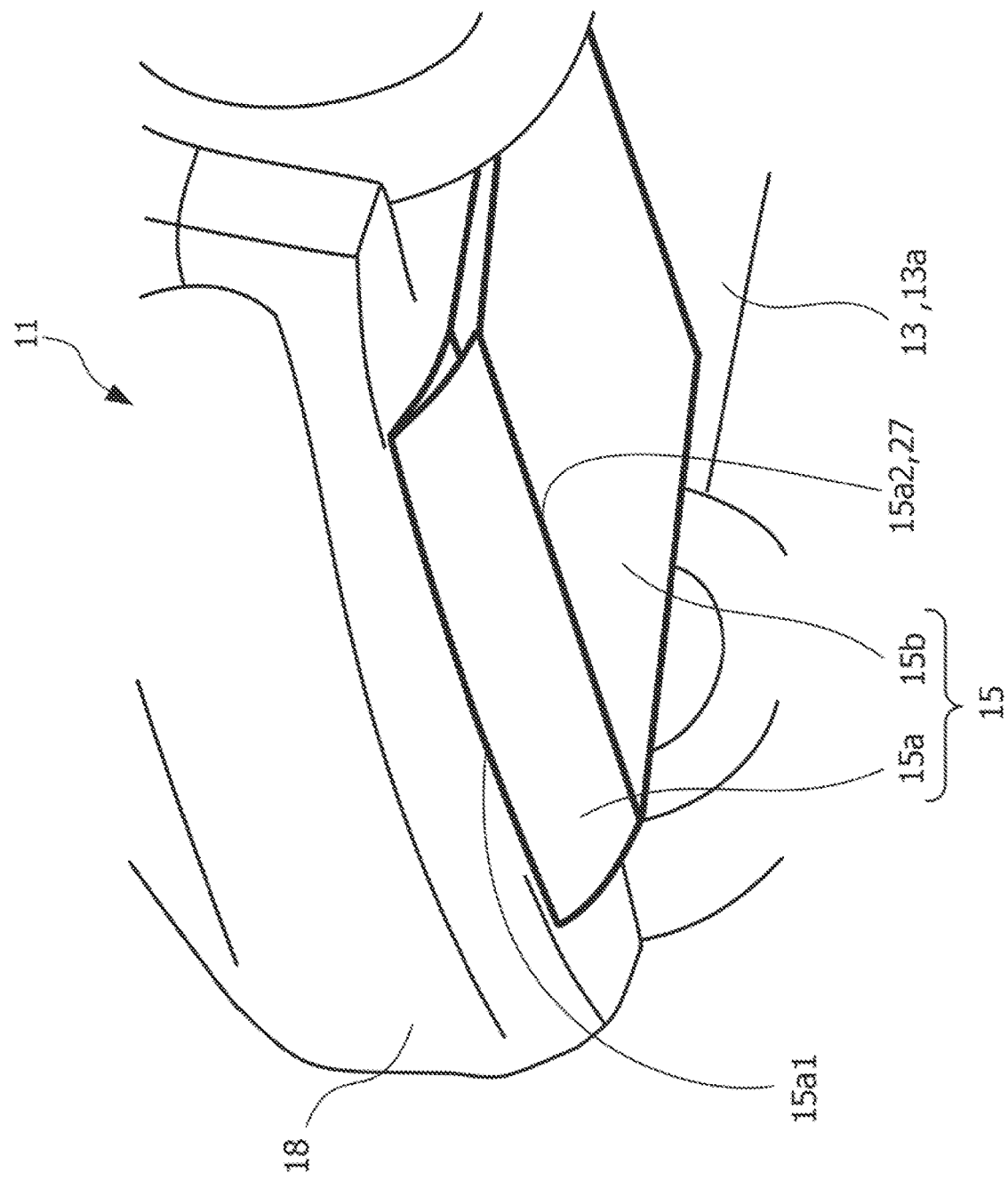

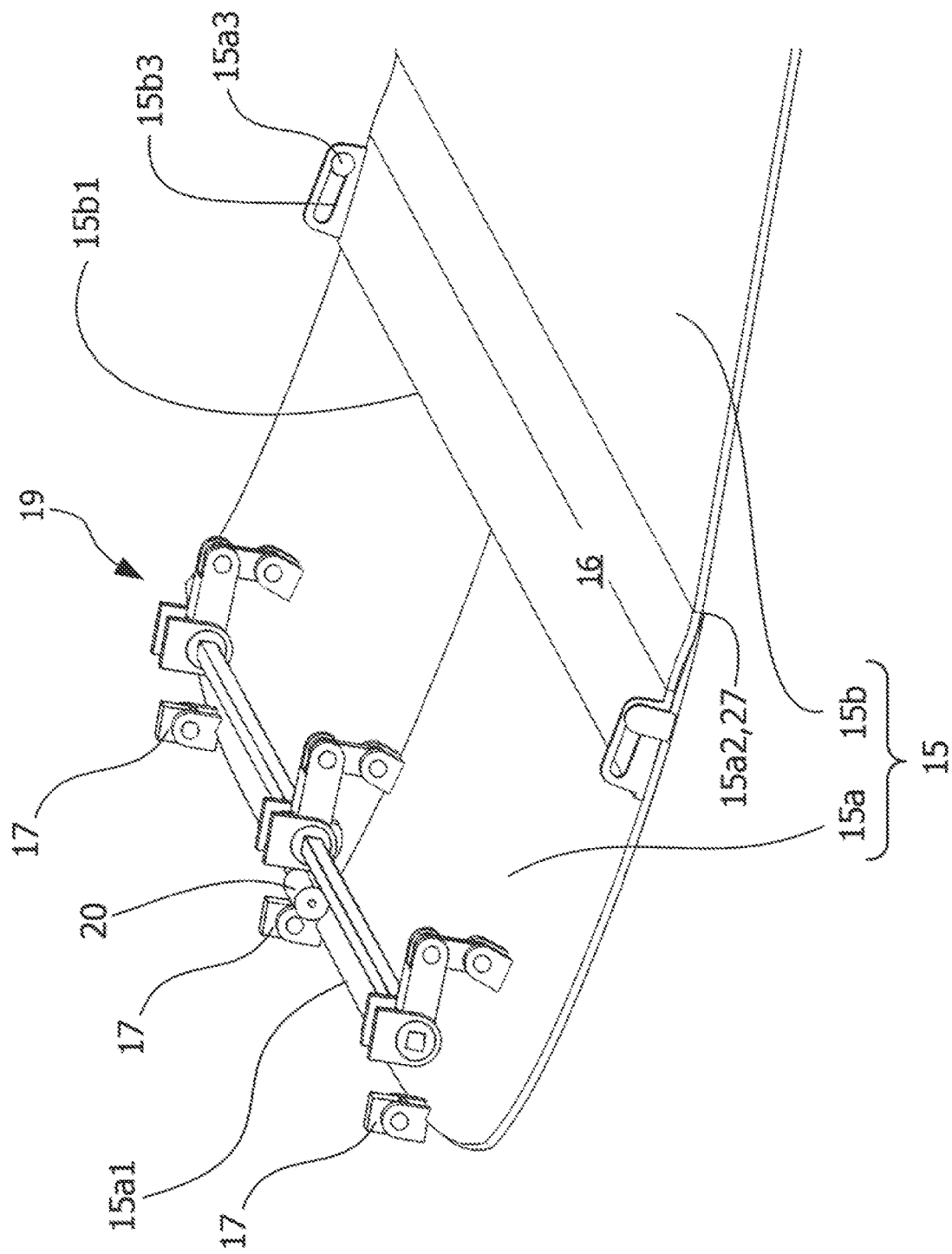

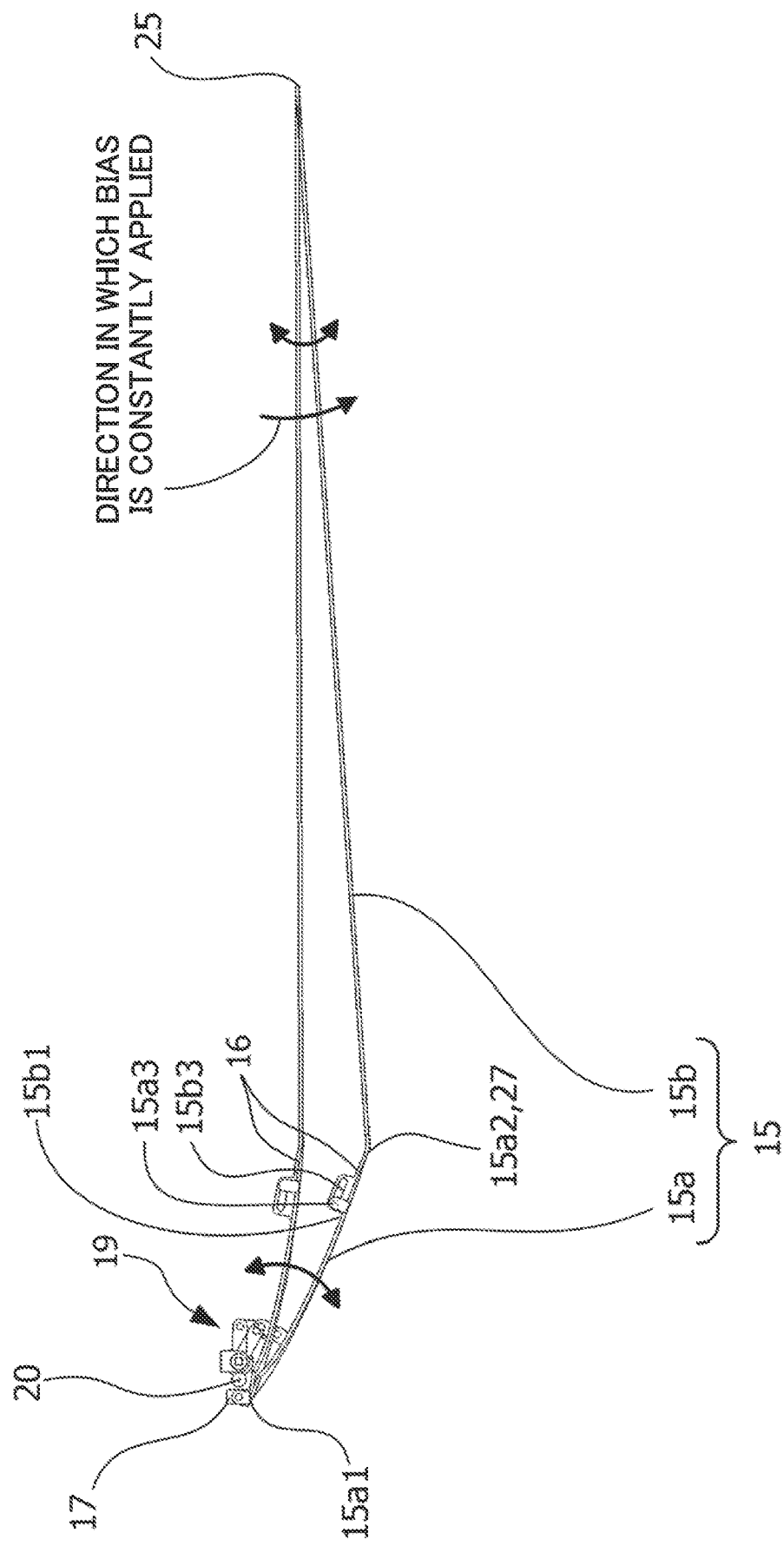

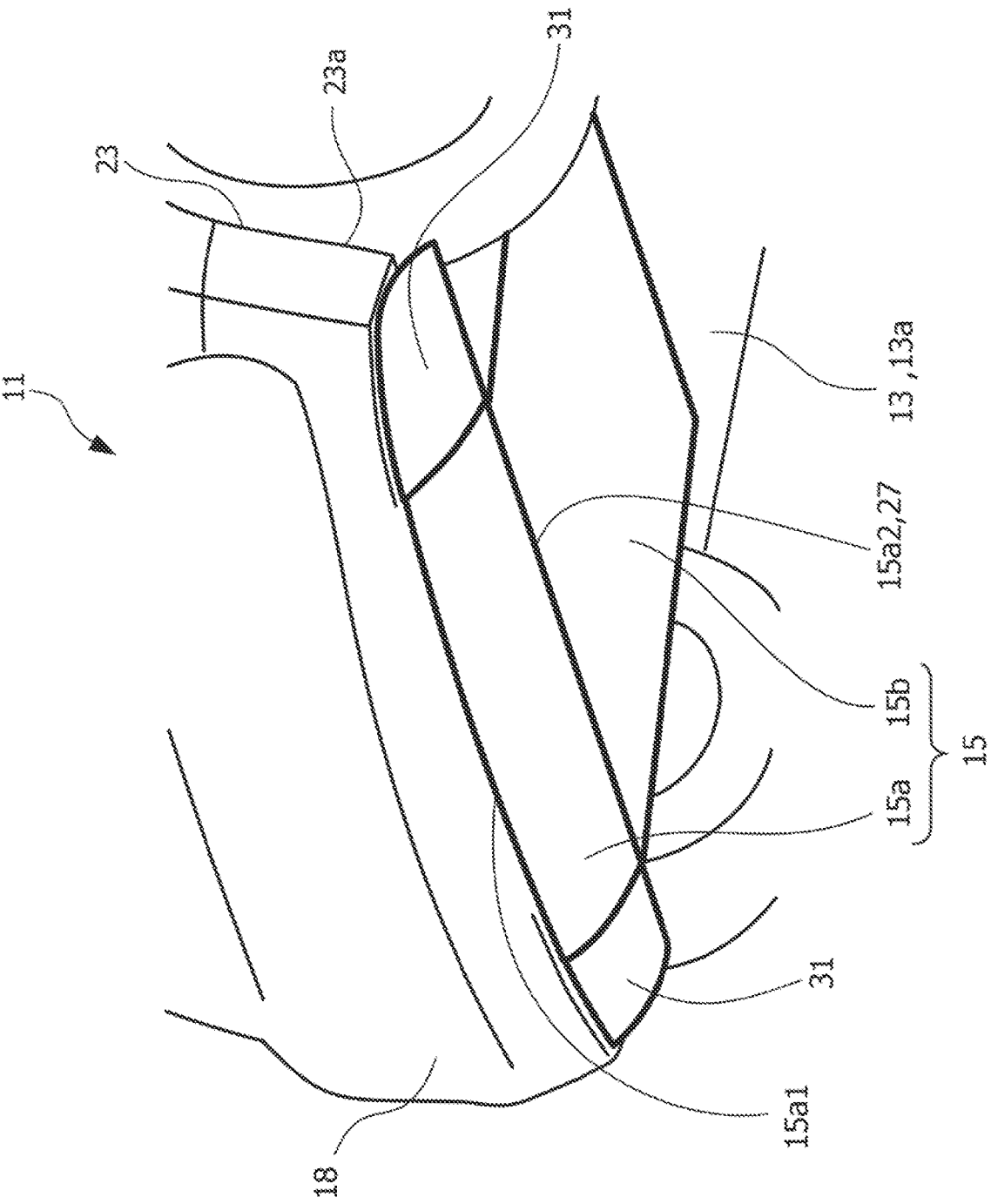

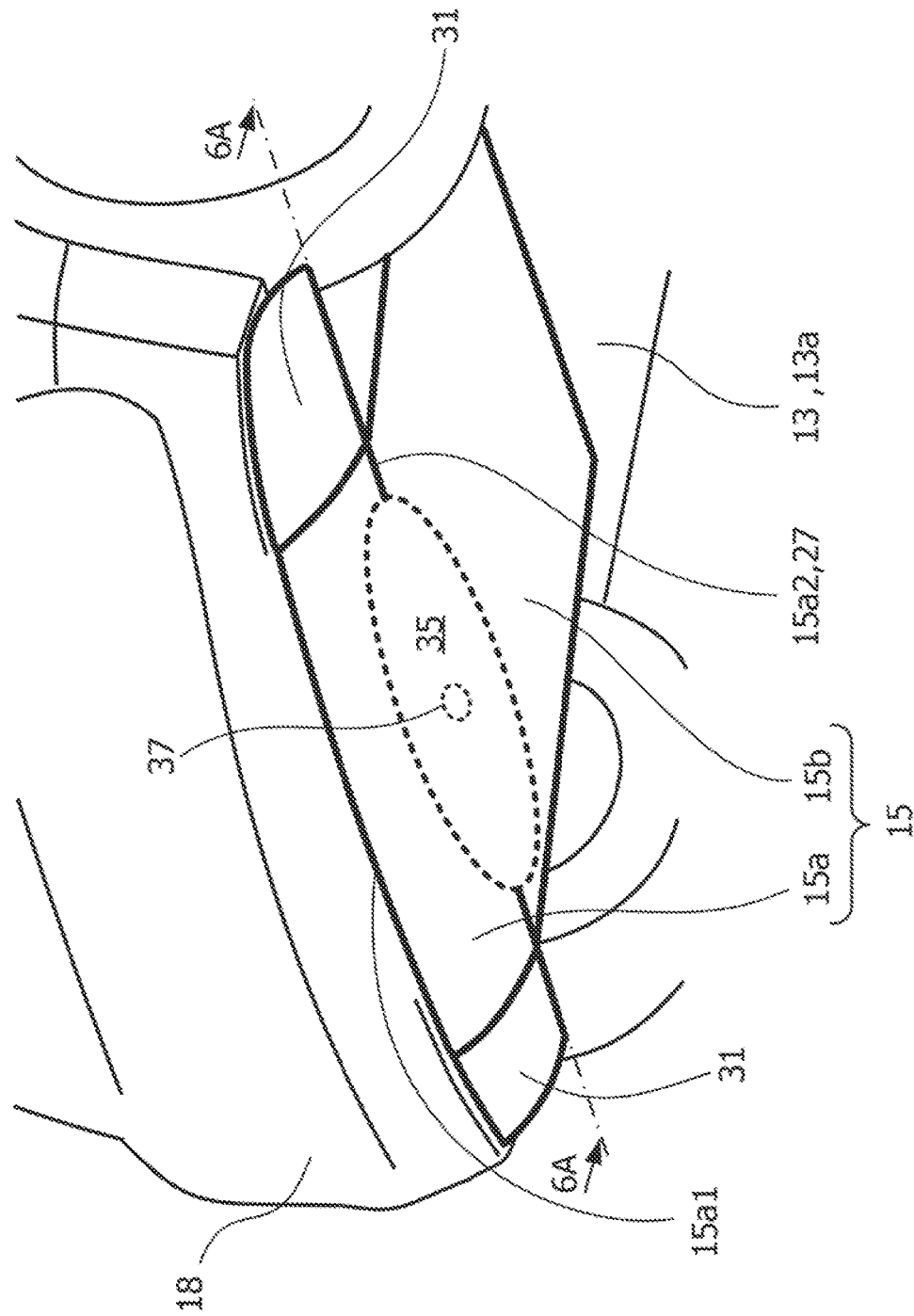

UNDERCOVER STRUCTURE

CROSS-REFERENCE TO RELATED APPLICATION

This application is based upon and claims priority from the Japanese Patent Application No. 2020-127726, filed on Jul. 28, 2020, the entire contents of which are incorporated herein by reference.

BACKGROUND OF THE INVENTION

Field of the Invention

The present invention relates to an undercover structure that covers a lower part of a vehicle body of a vehicle.

Description of the Related Art

The applicant of the present application discloses an undercover structure that covers a lower part of a vehicle body of a vehicle (JP 2009-220689 A). The undercover structure according to JP 2009-220689 A is configured to allow an undercover that covers almost the entirety of a bottom surface of the vehicle body to move toward or away from an underpanel provided over the bottom surface of the vehicle body.

The undercover structure according to JP 2009-220689 A is configured to move the undercover downward away from the underpanel when the vehicle travels at a high speed. This allows a reduction in the lowest ground clearance of the vehicle as compared with when the vehicle is at a stop or travels at a low speed. This in turn increases the velocity of airflow between the undercover and a road surface. As a result, a negative pressure is applied to the vehicle body to attract the vehicle body to the road surface.

The use of the undercover structure according to JP 2009-220689 A allows an increase in traveling stability and steering stability of the vehicle when the vehicle travels at a high speed.

SUMMARY OF THE INVENTION

Undercover structures in the related art cause airflow generated between the undercover and the road surface (hereinafter, referred to as an airflow between a road and a vehicle) to partially flow into front wheelhouses. This makes the negative pressure generated between the undercover and the road surface (hereinafter, referred to as a negative pressure between a road and a vehicle) relatively small. This consequently becomes disadvantage for increasing traveling stability and steering stability of the vehicle. Further, noise caused by the airflow between a road and a vehicle into the front wheelhouses decreases comfort. Such undercover structures in the related art have room for improvement in such various points.

The present invention has been made in view of the above-described circumstances, and it is therefore an object of the present invention to provide an undercover structure capable of providing traveling stability, steering stability, and comfort of a vehicle at high levels.

In order to achieve the above-described object, provided is an undercover structure including an undercover provided on a vehicle body of a vehicle to cover a lower part of the vehicle body, the undercover having a lowermost part positioned ahead of a front wheel axle, a curved part with a predetermined curvature being formed at the lowermost part of the undercover in a side view.

The undercover structure according to the present invention can provide traveling stability, steering stability, and comfort of the vehicle at high levels.

BRIEF DESCRIPTION OF DRAWINGS

FIG. 1A is a worm's-eye view of a vehicle to which an undercover structure (with an undercover retracted) according to an embodiment of the present invention is applied;

FIG. 1B is a worm's-eye view of the vehicle to which the undercover structure (with the undercover deployed) according to the embodiment of the present invention is applied;

FIG. 1C is a worm's-eye view of the vehicle to which the undercover structure (with the undercover shown for comparison between the retracted state and the deployed state) according to the embodiment of the present invention is applied;

FIG. 2A is a bird's-eye view of the undercover (when retracted) according to the embodiment of the present invention;

FIG. 3A is a side view of the undercover (for comparison between the retracted state and the deployed state) according to the embodiment of the present invention;

FIG. 5A is a worm's-eye view of an undercover structure (when deployed) according to the first modification of the present invention;

FIG. 6A is a worm's-eye view of an undercover structure (when deployed) according to a third modification of the present invention;

DETAILED DESCRIPTION OF THE EMBODIMENTS

Figure 2B:
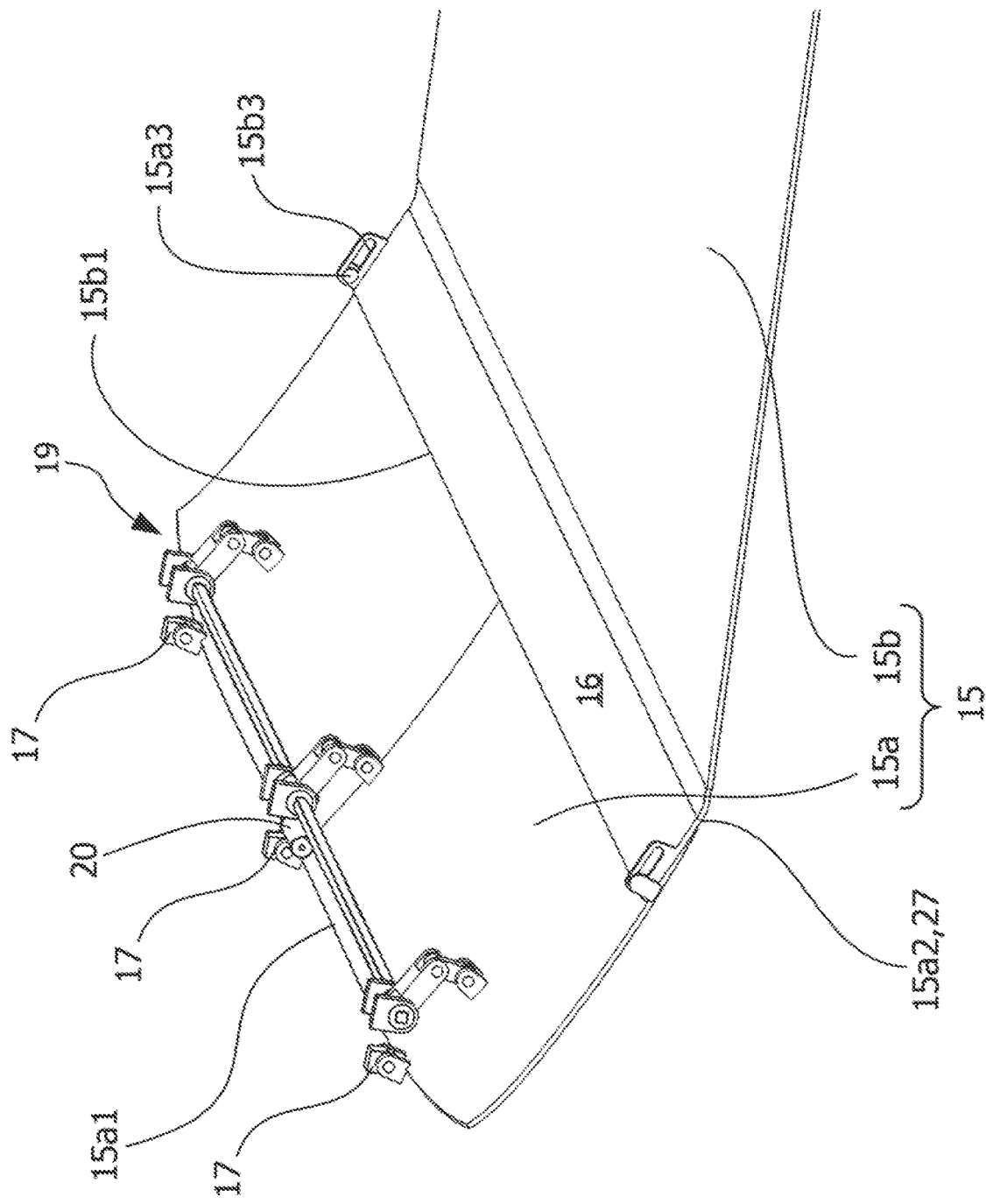
FIG. 2B is a bird's-eye view of the undercover (when deployed) according to the embodiment of the present invention.

Hereinafter, an undercover structure according to an embodiment of the present invention will be described in detail with reference to the drawings.

Note that, in the following drawings, members having a common feature or members having features associated with each other are denoted by a common reference sign in principle. For convenience of description, the size and shape of each member may be schematically represented in a deformed or exaggerated manner.

In the following description, an up-down direction, a vehicle width direction, and a front-rear direction each correspond to a direction based on a state where the vehicle 11 is horizontally placed.

[Undercover Structure According to Embodiment of Present Invention]

First, a schematic structure of a vehicle 11 to which the undercover structure according to the embodiment of the present invention is applied will be described with reference, as needed, to FIGS. 1A to 1C.

FIG. 1A is a worm's-eye view of the vehicle 11 to which the undercover structure (with an undercover 15 retracted) according to the embodiment of the present invention is applied. FIG. 1B is a worm's-eye view of the vehicle 11 to which the undercover structure (with the undercover 15 deployed) according to the embodiment of the present invention is applied. FIG. 1C is a worm's-eye view of the vehicle 11 to which the undercover structure (with the undercover 15 shown for comparison between the retracted state and the deployed state) according to the embodiment of the present invention is applied.

As shown in FIGS. 1A to 1C, the undercover 15 according to the embodiment of the present invention is provided on a vehicle body 13 of the vehicle 11 to cover a front side of an underpanel (lower part) 13a of the vehicle body 13. In general, components such as an oil pan, a suspension arm, and an exhaust pipe (not shown) are suitably arranged at the front side of the lower part of the vehicle body 13. Therefore, the underpanel 13a has an atypical shape (not a flat shape) to fit to the layout of the components.

In this respect, the undercover 15 according to the embodiment of the present invention is provided on the vehicle body 13 of the vehicle 11 to cover the front side of the underpanel (lower part) 13a of the vehicle body 13 as described above. Further, as shown in FIGS. 1A to 1C, the undercover 15 has an approximately flat shape with some undulations in a worm's-eye view of the vehicle 11.

Therefore, the vehicle 11 in which the undercover 15 according to the embodiment of the present invention is provided on the underpanel (lower part) 13a of the vehicle body 13 can straighten the airflow between a road and a vehicle generated between the undercover 15 and the road surface (can make the airflow between a road and a vehicle less turbulent). The other effects will be described later as needed.

[Undercover 15 According to Embodiment of Present Invention]

Next, the undercover 15 according to the embodiment of the present invention will be described with reference, as needed, to FIGS. 1A to 1C, FIGS. 2A to 2C, FIGS. 3A to 3C, and FIG. 4.

Figure 2C:
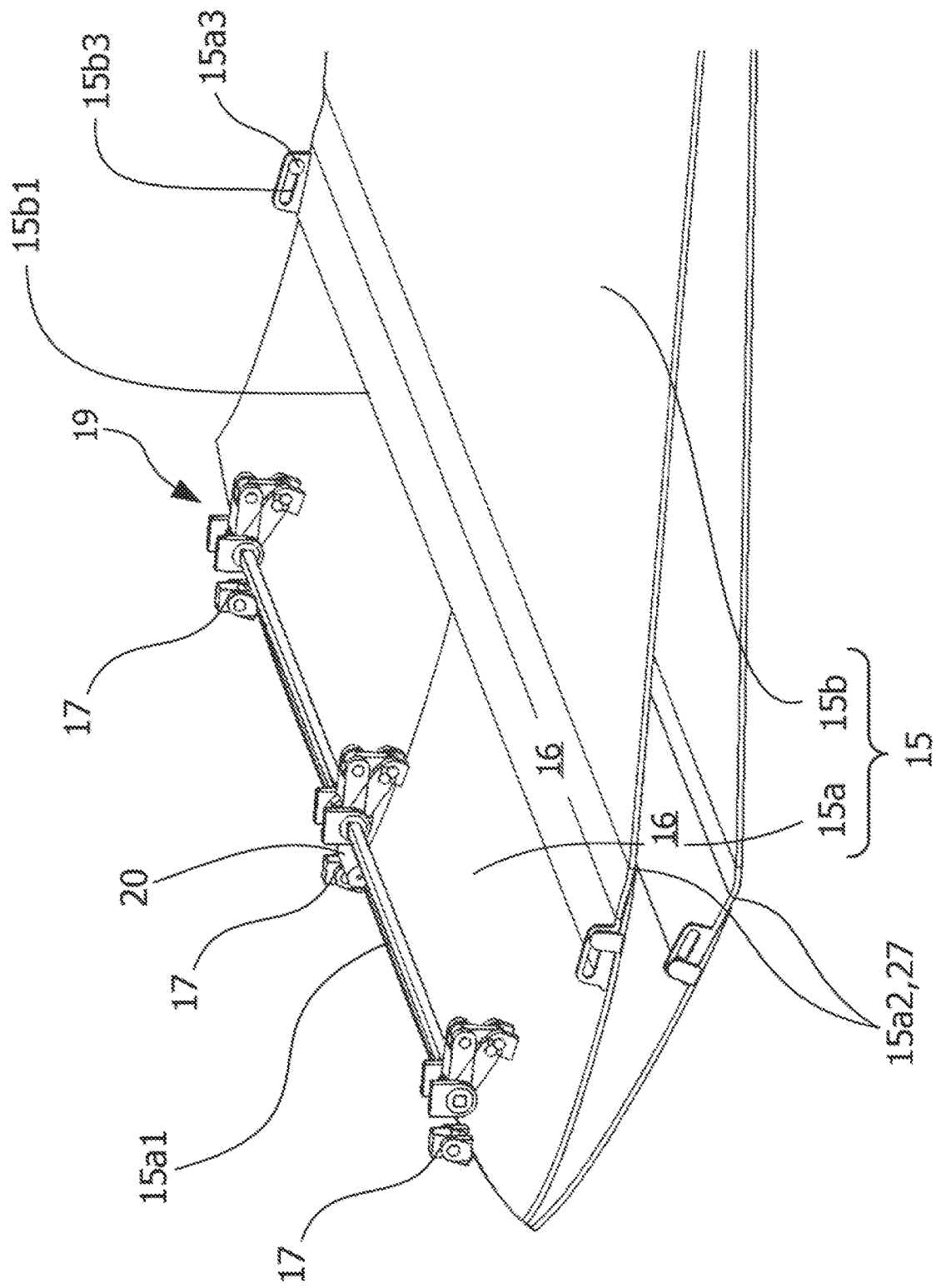
FIG. 2C is a bird's-eye view of the undercover (for comparison between the retracted state and the deployed state) according to the embodiment of the present invention.
Figure 3B:
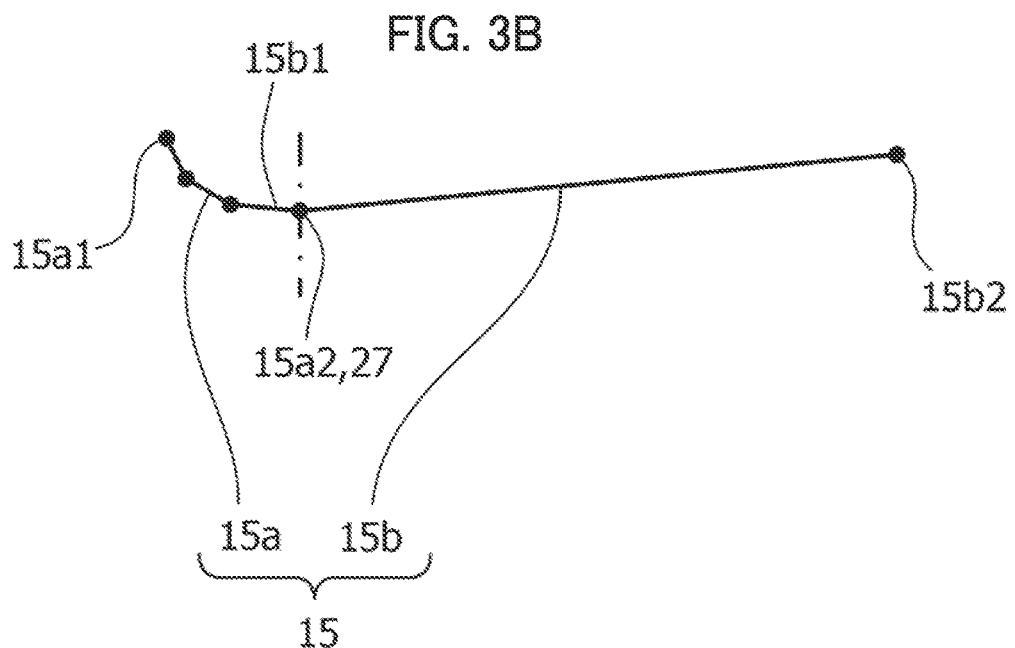
FIG. 3B is a side view of an undercover (when deployed) according to a first modification of the present invention.
Figure 3C:
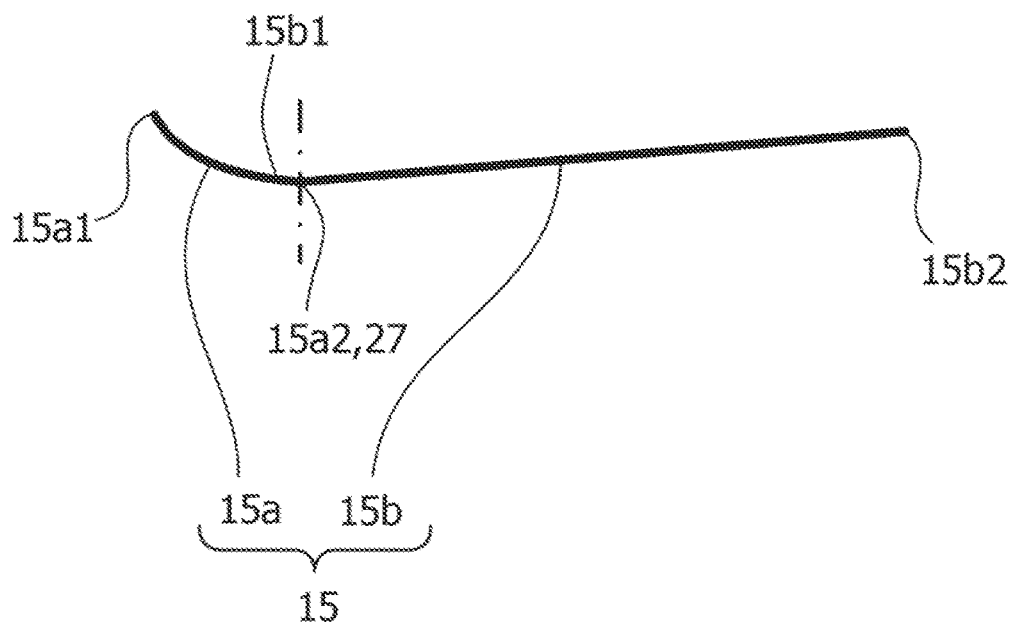
FIG. 3C is a side view of an undercover (when deployed) according to a second modification of the present invention.
Figure 4:
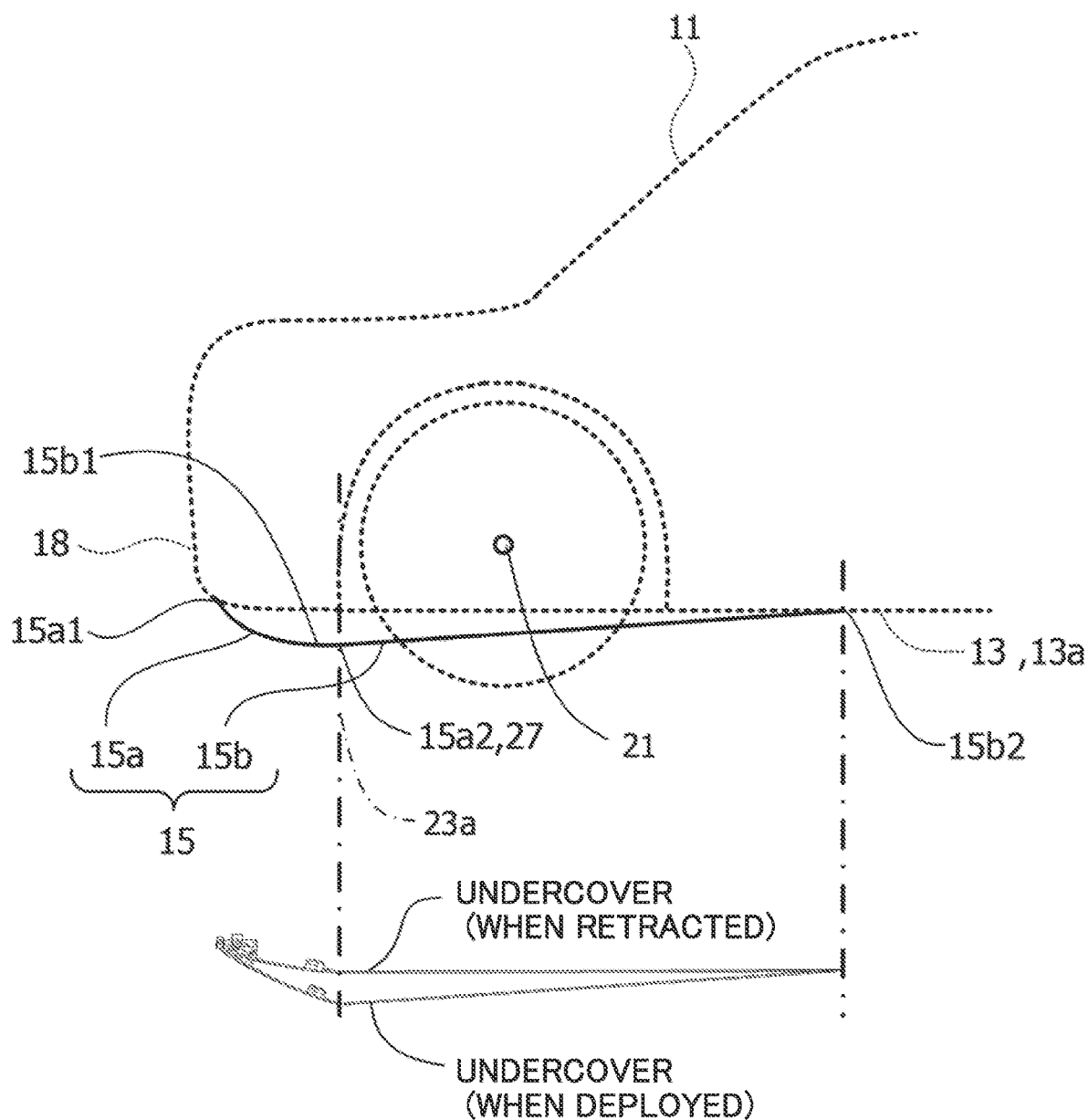
FIG. 4 is a side view of a front part of the vehicle to which the undercover structure (with the undercover shown for comparison between the retracted state and the deployed state) according to the embodiment of the present invention is applied.

FIG. 2A is a bird's-eye view of the undercover 15 (when retracted) according to the embodiment of the present invention. FIG. 2B is a bird's-eye view of the undercover 15 (when deployed) according to the embodiment of the present invention. FIG. 2C is a bird's-eye view of the undercover 15 (for comparison between the retracted state and the deployed state) according to the embodiment of the present invention. FIG. 3A is a side view of the undercover 15 (for comparison between the retracted state and the deployed state) according to the embodiment of the present invention. FIG. 3B is a side view of an undercover 15 (when deployed) according to a first modification of the present invention. FIG. 3C is a side view of an undercover 15 (when deployed) according to a second modification of the present invention. FIG. 4 is a side view of a front part of the vehicle 11 to which the undercover structure (with the undercover 15 shown for comparison between the retracted state and the deployed state) according to the embodiment of the present invention is applied.

As shown in FIGS. 1A to 1C, FIGS. 2A to 2C, FIG. 3A, and FIG. 4, the undercover 15 according to the embodiment of the present invention includes a first cover part 15a disposed at the front side of the vehicle 11 and a second cover part 15b disposed at a rear side of the first cover part 15a to extend rearward.

The first cover part 15a of the undercover 15 has a first front end 15a1 provided on the vehicle body 13 as shown in FIGS. 1A to 1C, and FIG. 4. As shown in FIG. 3A, the first front end 15a1 of the first cover part 15a is positioned higher than a first rear end 15a2 of the first cover part 15a.

Specifically, as shown in FIGS. 2A to 2C, and FIG. 3A, the first front end 15a1 of the first cover part 15a is pivotally supported by the vehicle body 13 via a first attachment member 17 suitably provided over the vehicle body 13 in the vehicle width direction. That is, as shown in FIG. 4, the first front end 15a1 of the first cover part 15a is supported in contact with the vicinity of a front lower end of a front bumper 18.

As shown in FIGS. 2A to 2C, and FIG. 3A, a link mechanism 19 is provided at the first front end 15a1 of the first cover part 15a. The link mechanism 19 is configured to be actuated by an actuator 20 to allow the first cover part 15a to pivot via the first attachment member 17. That is, the undercover 15 is supported movable in the up-down direction relative to the vehicle body 13 of the vehicle 11. Further, the undercover 15 is movable by the actuator 20.

As shown in FIGS. 2A to 2C and 3A, the first rear end 15a2 of the first cover part 15a is positioned at the lowermost part of the undercover 15. This causes, as shown in FIG. 3A, a curved part 27 with a predetermined curvature to be formed at the first rear end 15a2 of the first cover part 15a of the undercover 15 in the front-rear direction (in the side view). The predetermined curvature of the curved part 27 is suitably set so as to allow the airflow between a road and a vehicle passing through the vicinity of the first rear end 15a2 of the first cover part 15a to be smoothly guided from the front to the rear.

Further, as shown in FIG. 4, the first rear end 15a2 of the first cover part 15a is positioned ahead of a front wheel axle 21.

Specifically, the first rear end 15a2 of the first cover part 15a is positioned near a front end 23a of each wheelhouse 23 as shown in FIG. 4.

As shown in FIGS. 2A to 2C, and FIG. 3A, the first rear end 15a2 of the first cover part 15a and a second front end 15b1 of the second cover part 15b are in contact with each other with the first rear end 15a2 and the second front end 15b1 placed on top of each other. In this contact part 16, the first rear end 15a2 of the first cover part 15a is positioned below the second front end 15b1 of the second cover part 15b as shown in FIGS. 2A to 2C, and FIG. 3A. This allow the airflow between a road and a vehicle generated along a bottom surface of the first cover part 15a of the undercover 15 to smoothly pass from the front to the rear.

Specifically, the first rear end 15a2 of the first cover part 15a and the second front end 15b1 of the second cover part 15b are linked to each other by a pair of pins 15a3 loosely inserted into a pair of long holes 15b3 to be movable in the front-rear direction and the up-down direction, the pair of pins 15*a*3 being provided near the first rear end 15*a*2 of the first cover part 15*a*, the pair of long holes 15*b*3 being provided near of the second front end 15*b*1 of the second cover part 15*b*.

As shown in FIG. 3A, a second rear end 15*b*2 of the second cover part 15*b* of the undercover 15 is pivotally supported by the vehicle body 13 via a second attachment member 25 suitably provided over the vehicle body 13 in the vehicle width direction. The second cover part 15*b* of the undercover 15 is biased in a direction of an arrow shown in FIG. 3A under the action of a spring member (not shown) or the like. This allows the undercover 15 to be smoothly driven to a deployment position.

As shown in FIG. 3A, the first cover part 15*a* of the undercover 15 has a side-view shape following or approximating a spline curve that is a smooth curve gently protruding downward.

On the other hand, as shown in FIG. 3A, the second cover part 15*b* of the undercover 15 has a side-view shape following an approximately straight line.

Although not particularly limited, it is preferable that the undercover 15 be made of, for example, a lightweight and rigid synthetic resin.

As shown in FIG. 3B, the undercover 15 according to the first modification of the present invention has a side-view shape following a linear spline curve.

As shown in FIG. 3C, the undercover 15 according to the second modification of the present invention has a side-view shape following a quadratic spline curve.

[Undercover Structure According to First and Second Modifications of Present Invention]

Next, undercover structures according to the first and second modifications of the present invention will be described with reference, as needed, to FIGS. 5A and 5B.

Figure 5B:
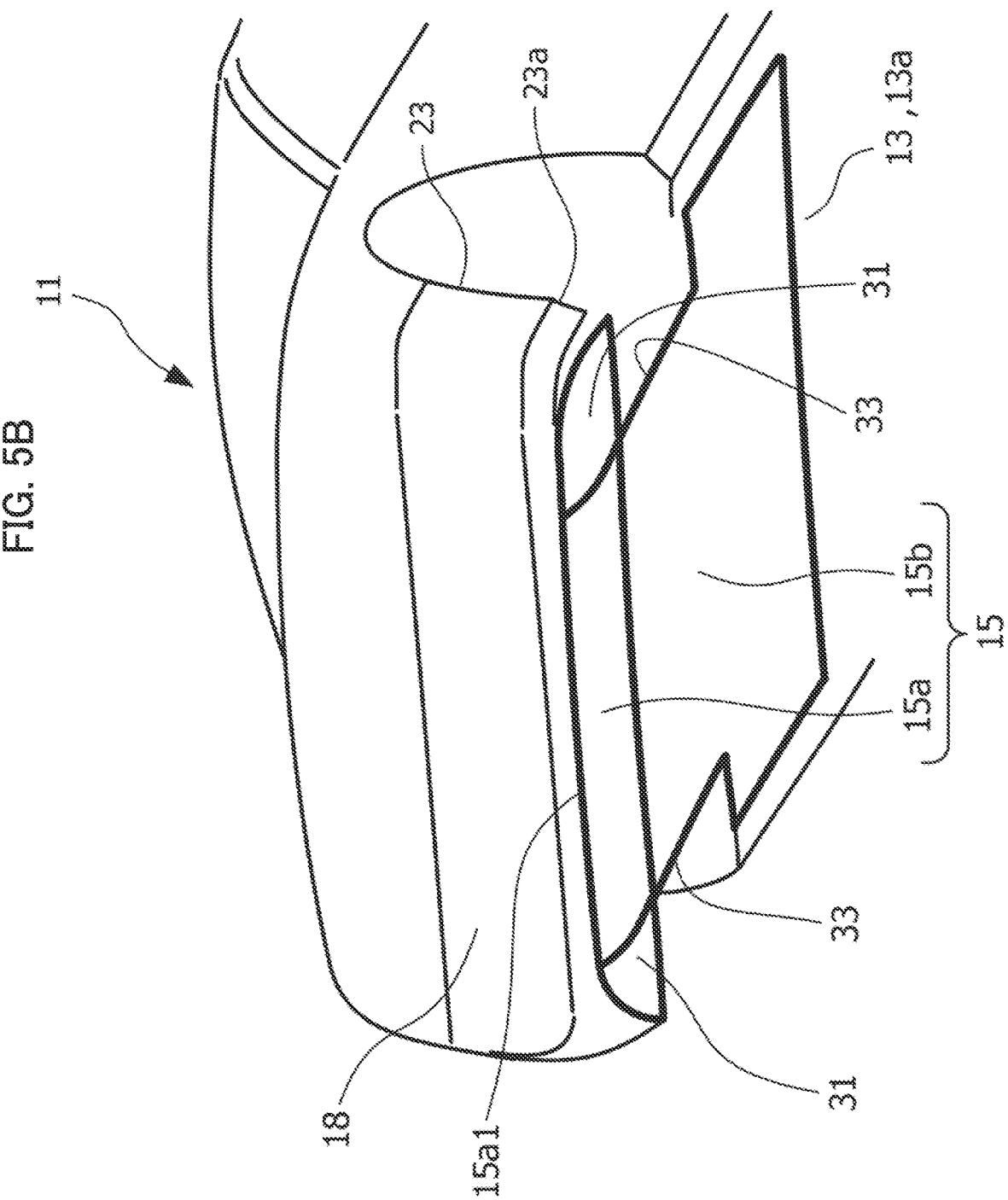
FIG. 5B is a worm's-eye view of an undercover structure (when deployed) according to the second modification of the present invention.

FIG. 5A is a worm's-eye view of the undercover structure (when deployed) according to the first modification of the present invention. FIG. 5B is a worm's-eye view of the undercover structure (when deployed) according to the second modification of the present invention.

In the undercover structure according to the first modification of the present invention, the first cover part 15*a* of the undercover 15 has a pair of side air guide parts 31 provided ahead of the front end 23*a* of each wheelhouse 23 as shown in FIGS. 5A and 5B, the pair of side air guide parts 31 each extending to the vicinity of a corresponding end of the vehicle 11 in the vehicle width direction. The side air guide parts 31 have a role of making the airflow between a road and a vehicle in the wheelhouse 23 less turbulent to increase a negative pressure generated by the airflow between a road and a vehicle and regulate a flow rate of the airflow between a road and a vehicle.

The undercover structure according to the second modification of the present invention is based on the undercover structure according to the first modification and further has a recessed part 33 provided in a part of the second cover part 15*b* of the undercover 15 corresponding to each wheelhouse 23. This makes it possible to prevent contact between the undercover 15 and front tires when the front wheels are steered. Further, as with the undercover structure according to the first modification, the undercover structure according to the second modification can expectedly make the airflow between a road and a vehicle in each wheelhouse 23 less turbulent to increase a negative pressure generated by the airflow between a road and a vehicle and bring the flow rate of the airflow between a road and a vehicle to reasonable levels.

Note that the undercover structures according to the first and second modifications of the present invention each have a curved part 27 with a predetermined curvature formed at the lowermost part of each of the pair of side air guide parts 31 in the side view as shown in FIGS. 5A and 5B. That is, each of the pair of side air guide parts 31 has a side-view shape following or approximating a spline curve that is a smooth curve gently protruding downward.

Further, each of the pair of side air guide parts 31 is provided integrally with the first cover part 15*a* of the undercover 15.

Note that a structure where each of the pair of side air guide parts 31 is provided separately from the first cover part 15*a* of the undercover 15 may be employed. In this structure, as with the first cover part 15*a*, the link mechanism 19 and a motor actuator 20 that actuates the link mechanism 19 may be provided for each of the pair of side air guide parts 31. This structure may be provided with the link mechanism 19 capable of simultaneously actuating the pair of side air guide parts 31. This structure allows a reduction in the number of motor actuators 20 from two to one.

[Undercover Structure According to Third Modification of Present Invention]

Next, an undercover structure according to a third modification of the present invention will be described with reference, as needed, to FIGS. 6A and 6B.

Figure 6B:
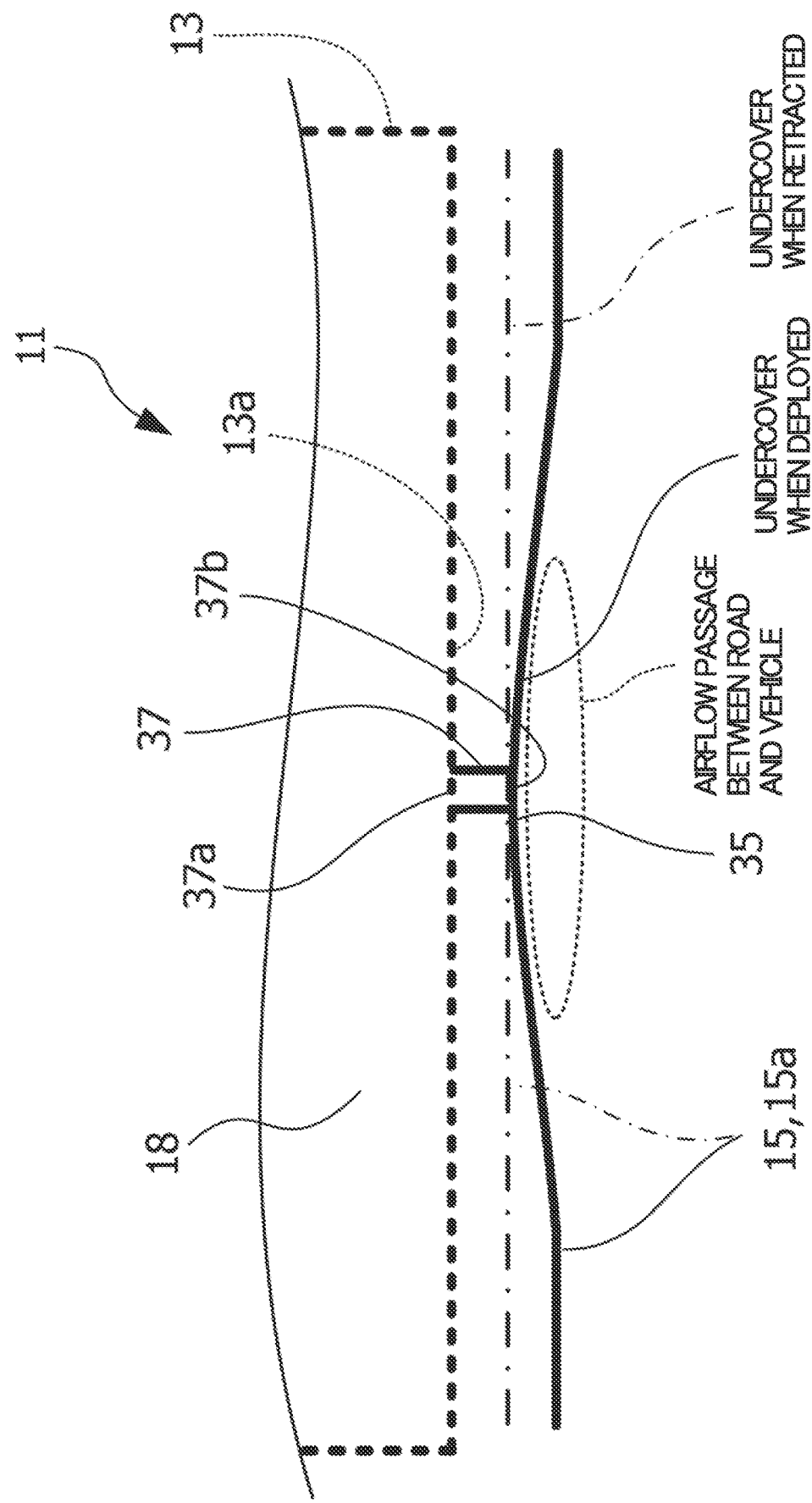
FIG. 6B is a cross-sectional view of the undercover structure (when deployed) according to the third modification shown in FIG. 6A, as viewed in a direction of an arrow 6A-6A.

FIG. 6A is a worm's-eye view of an undercover structure (when deployed) according to the third modification of the present invention. FIG. 6B is a cross-sectional view of the undercover structure (when deployed) according to the third modification shown in FIG. 6A, as viewed in a direction of an arrow 6A-6A.

The undercover structure according to the third modification of the present invention is almost the same as the undercover structure according to the first modification of the present invention. Therefore, a description will be given with focusing on points of difference from the undercover structure according to the first modification of the present invention (with no description given of common points) as a description of the undercover structure according to the third modification of the present invention.

The undercover structure according to the first modification of the present invention has room for improvement in, for example, aerodynamic characteristics around the undercover 15 when the vehicle 11 travels with the undercover 15 deployed (see FIG. 5A).

Therefore, the undercover structure according to the third modification of the present invention has, as shown in FIGS. 6A and 6B, a deployment suppression part 35 with an approximately elliptical shape formed around the curved part 27 near the center of the undercover 15 in the vehicle width direction. In order to form the deployment suppression part 35 in the undercover 15, a restraining member 37 configured to restrain and suppress the deployment of the undercover 15 is provided at a part of the curved part 27 located at the center of the undercover 15 in the vehicle width direction.

The restraining member 37 has an approximately columnar shape having one end 37*a* fixed to the underpanel 13*a* of the vehicle body 13 and the other end 37*b* fixed to the part of the curved part 27 located at the center of the undercover 15 in the vehicle width direction. This causes the part of the curved part 27 located at the center of the undercover 15 in the vehicle width direction to be suspended and supported by the vehicle body 13 via the restraining member 37.

In the undercover structure according to the third modification of the present invention, the undercover 15 is made of, for example, a flexible synthetic resin.

Next, a description will be given of how the undercover structure according to the third modification of the present invention operates.

For example, it is assumed that the undercover 15 has changed from the retracted state to the deployed state (see FIGS. 6A and 6B) when the vehicle 11 travels at a high speed. At this time, as shown in FIGS. 6A and 6B, the restraining member 37 restrains and suppresses deployment of the part around the curved part 27 located at the center of the undercover 15 in the vehicle width direction.

As shown in FIG. 6B, the undercover structure according to the third modification has the undercover 15 formed into a shape gently protruding toward both ends with the center in the vehicle width direction as a vertex in a front view of the vehicle 11. As a result, as shown in FIG. 6B, an approximately chevron-shaped airflow passage is formed at and around the center of the undercover 15 in the vehicle width direction in the front view.

This makes it possible to satisfactorily maintain the aerodynamic characteristics around the undercover 15 when the vehicle 11 travels at a high speed, for example. Further, since the airflow between a road and a vehicle passes along the approximately chevron-shaped airflow passage (see FIG. 6B) formed at and around the center of the undercover 15 in the vehicle width direction in the front view, an effect of increasing the ability of the vehicle 11 to hold a straight line can be expected.

[Undercover Structure According to Fourth Modification of Present Invention]

Next, an undercover structure according to a fourth modification of the present invention will be described with reference, as needed, to FIGS. 7A and 7B.

Figure 7A:
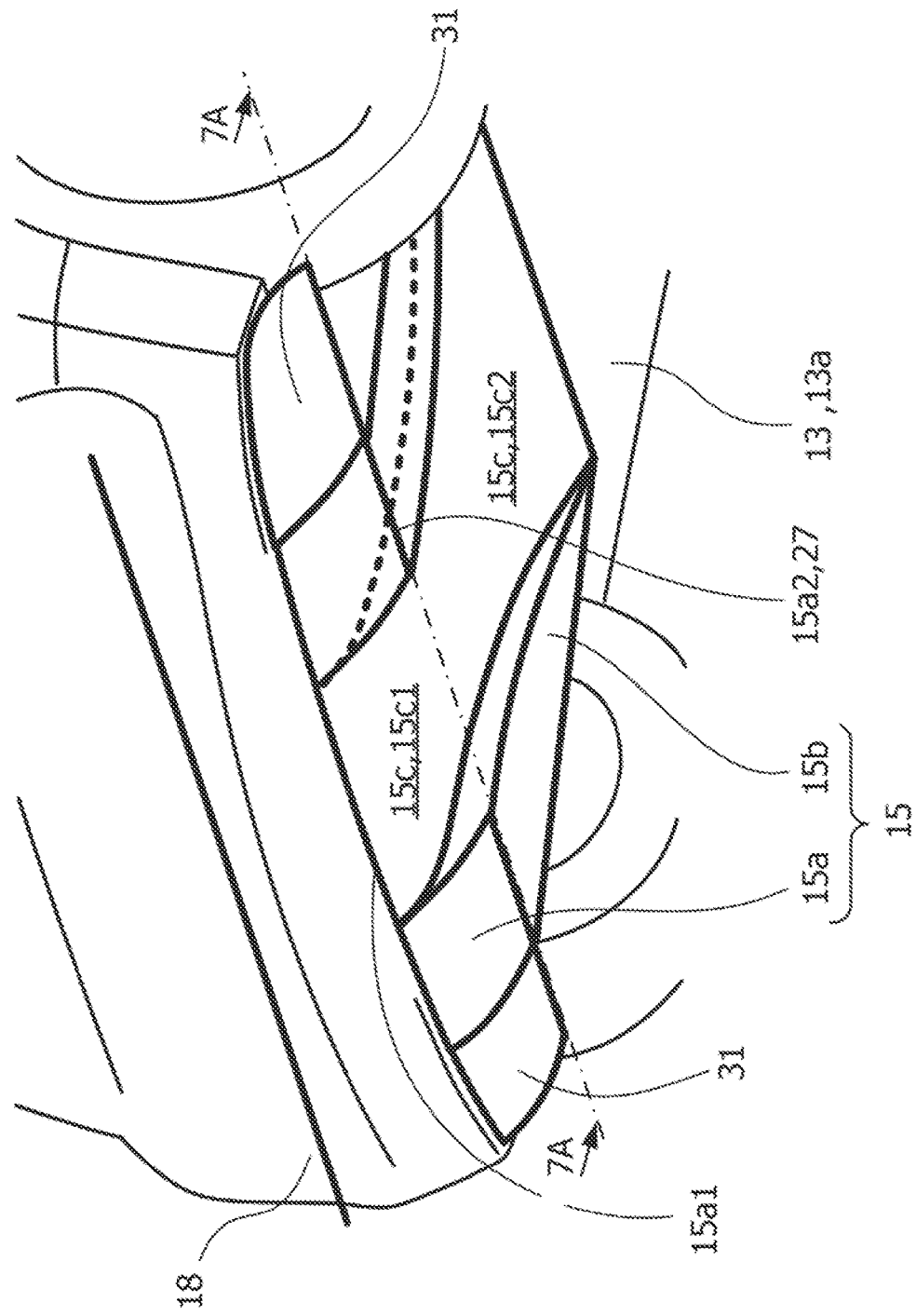
FIG. 7A is a worm's-eye view of an undercover structure (when deployed) according to a fourth modification of the present invention.

FIG. 7A is a worm's-eye view of the undercover structure (when deployed) according to the fourth modification of the present invention. FIG. 7B is a cross-sectional view of the undercover structure (when deployed) according to the fourth modification shown in FIG. 7A, as viewed in a direction of an arrow 7A-7A.

The undercover structure according to the fourth modification of the present invention shares the technical idea of satisfactorily maintaining the aerodynamic characteristics with the undercover structure according to the third modification of the present invention. Therefore, a description will be given with focusing on points of difference from the undercover structure according to the third modification of the present invention (with no description given of common points) as a description of the undercover structure according to the fourth modification of the present invention.

The undercover structure according to the third modification of the present invention has room for improvement in, for example, the ability of the vehicle 11 to hold a straight line when the vehicle 11 travels with the undercover 15 deployed (see FIGS. 6A and 6B).

Figure 7B:
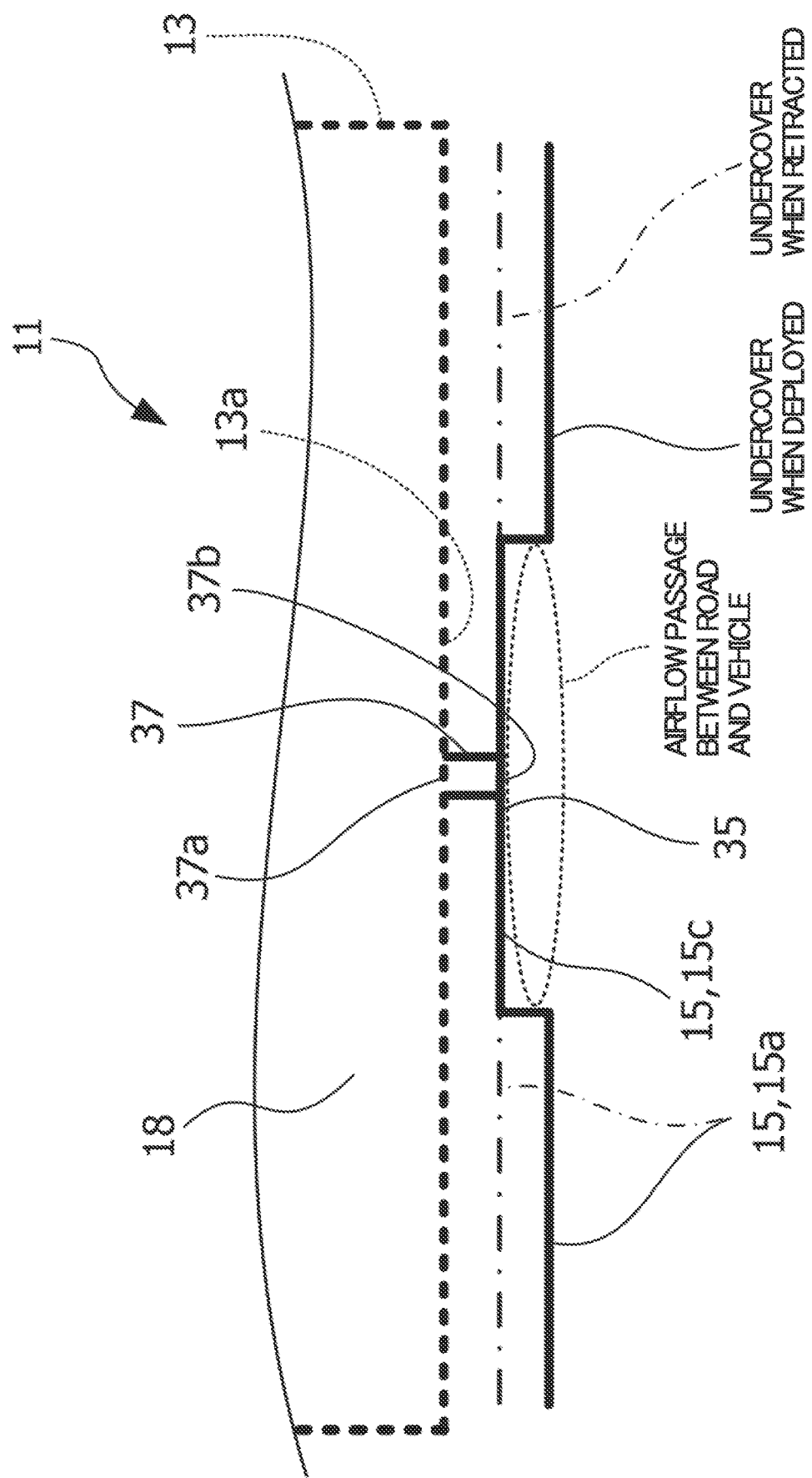
FIG. 7B is a cross-sectional view of the undercover structure (when deployed) according to the fourth modification shown in FIG. 7A, as viewed in a direction of an arrow 7A-7A.

Therefore, the undercover structure according to the fourth modification of the present invention has, as shown in FIGS. 7A and 7B, a deployment suppression part 35 with an approximately rectangular shape in the front view formed at and around the center of the undercover 15 in the vehicle width direction. In order to form the deployment suppression part 35 in the undercover 15, the undercover 15 has first and second fixed parts 15c1, 15c2 extending in the vehicle length direction orthogonal to the vehicle width direction individually formed at the center in the vehicle width direction.

More specifically, the first cover part 15a of the undercover 15 is divided into both side parts in the vehicle width direction that are configured to change from the retracted state to the deployed state and the first fixed part 15c1. On the other hand, the second cover part 15b of the undercover 15 is divided into both side parts in the vehicle width direction that are configured to change from the retracted state to the deployed state and the second fixed part 15c2. Note that the first and second fixed parts 15c1, 15c2 may be collectively referred to as a "fixed part 15c" (see FIG. 7B).

In the undercover structure according to the fourth modification of the present invention, the undercover 15 need not be flexible. The undercover 15, however, may be made of, for example a flexible synthetic resin.

Next, a description will be given of how the undercover structure according to the fourth modification of the present invention operates.

For example, it is assumed that the undercover 15 has changed from the retracted state to the deployed state (see FIGS. 7A and 7B) when the vehicle 11 travels at a high speed. At this time, as shown in FIGS. 7A and 7B, the restraining member 37 restrains deployment of the fixed part 15c located at the center of the undercover 15 in the vehicle width direction. On the other hand, the parts 15a, 15b located on both sides of the undercover 15 in the vehicle width direction changes from the retracted state to the deployed state in the same manner as the undercover 15 of the undercover structure according to the third modification.

As shown in FIG. 7B, the undercover structure according to the fourth modification has the undercover 15 formed into a rectangular shape in the front view of the vehicle 11. As a result, as shown in FIG. 7B, a rectangular airflow passage between a road and a vehicle is formed at and around the center of the undercover 15 in the vehicle width direction in the front view.

This makes it possible to satisfactorily maintain the aerodynamic characteristics around the undercover 15 when the vehicle 11 travels at a high speed as compared with the undercover structure according to the third modification. Further, since the airflow between a road and a vehicle passes along the approximately rectangular airflow passage (see FIG. 7B) formed at and around the center of the undercover 15 in the vehicle width direction in the front view, the ability of the vehicle 11 to hold a straight line can be increased as compared with the undercover structure according to the third modification.

[Function and Effect of Undercover Structure According to Embodiment of Present Invention]

Next, functions and effects of the undercover structure according to the embodiment of the present invention will be described.

An undercover structure according to a first aspect employs a structure of the undercover 15 provided on the vehicle body 13 of the vehicle 11 to cover the underpanel (lower part) 13a of the vehicle body 13 where the undercover 15 has the lowermost part (the first rear end 15a2 of the first cover part 15a) positioned ahead of the front wheel axle 21, and the curved part 27 with a predetermined curvature is formed at the first rear end 15a2 of the first cover part 15a that is the lowermost part of the undercover 15 in the side view.

In the undercover structure according to the first aspect, the undercover 15 has the first rear end 15a2 of the first cover part 15a, which is the lowermost part of the undercover 15, positioned ahead of the front wheel axle 21. Further, the curved part 27 with a predetermined curvature is formed at the first rear end 15a2 of the first cover part 15a that is the lowermost part of the undercover 15 in the side view. This generates a strong negative pressure in a region ahead of the front wheel axle 21. Accordingly, the flow rate of air flowing to each wheelhouse 23 decreases (the flow rate of the airflow between a road and a vehicle generated along the bottom surface of the first cover part 15a of the undercover 15 increases). This causes an attraction force that attracts the vehicle 11 to the road surface to act on the vehicle body 13 of the vehicle 11, thereby making traveling stability excellent.

According to the undercover structure according to the first aspect, the undercover 15 has the first rear end 15a2 of the first cover part 15a that is the lowermost part of the undercover 15 positioned ahead of the front wheel axle 21, and the curved part 27 with a predetermined curvature is formed at the first rear end 15a2 of the first cover part 15a that is the lowermost part of the undercover 15 in the side view, so that it is possible to obtain an undercover structure that can provide traveling stability, steering stability, and comfort of the vehicle 11 at high levels.

Further, an undercover structure according to a second aspect is based on the undercover structure according to the first aspect and may employ a structure of the undercover 15 including the first cover part 15a disposed at the front side of the underpanel (lower part) 13a of the vehicle body 13 of the vehicle 11 and the second cover part 15b disposed at the rear side of the first cover part 15a to extend rearward, the first cover part 15a of the undercover 15 having the first front end 15a1 provided on the vehicle body 13 and positioned higher than the first rear end 15a2 of the first cover part 15a.

In the undercover structure according to the second aspect, the first cover part 15a of the undercover 15 has the first front end 15a1 provided on the vehicle body 13 and positioned higher than the first rear end 15a2 of the first cover part 15a. This causes the bottom surface of the first cover part 15a that occupies the front side of the undercover 15 in the front-rear direction to have a shape that does not obstruct the airflow between a road and a vehicle generated along the bottom surface of the first cover part 15a.

According to the undercover structure according to the second aspect, it is possible to obtain an undercover structure that can provide traveling stability, steering stability, and comfort of the vehicle at high levels as compared with the undercover structure according to the first aspect.

Further, an undercover structure according to a third aspect is based on the undercover according to the second aspect and employs a structure where the second cover part 15b of the undercover 15 has the second rear end 15b2 provided on the vehicle body 13.

According to the undercover structure according to the third aspect, the second cover part 15b of the undercover 15 has the second rear end 15b2 provided on the vehicle body 13, so that an effect of straightening the airflow between a road and a vehicle generated along the bottom surface of the second cover part 15b of the undercover 15 can be expected.

Further, an undercover structure according to a fourth aspect is based the undercover structure according to the second or third aspect and employs a structure where the first cover part 15a extends for a length nearly equal to a vehicle width of the vehicle 11.

According to the undercover structure according to the fourth aspect, the first cover part 15a extends for a length nearly equal to the vehicle width of the vehicle 11, so that an effect of making the airflow between a road and a vehicle in each wheelhouse 23 less turbulent to increase a negative pressure generated by the airflow between a road and a vehicle and regulate the flow rate of the airflow between a road and a vehicle can be expected.

Further, an undercover structure according to a fifth aspect is based on the undercover structure according to any one of the second to fourth aspects and may employ a structure where the undercover 15 has the lowermost part positioned near the front end 23a of each wheelhouse 23.

According to the undercover structure according to the fifth aspect, the undercover 15 has the lowermost part positioned near the front end 23a of each wheelhouse 23, so that an effect of making the airflow between a road and a vehicle in each wheelhouse 23 less turbulent to increase a negative pressure generated by the airflow between a road and a vehicle and regulate the flow rate of the airflow between a road and a vehicle can be expected in the same manner as the undercover structure according to the fifth aspect.

Further, an undercover structure according to a sixth aspect is based on the undercover structure according to the fifth aspect and may employ a structure where the first cover part 15a has a side air guide part 31 provided ahead of the front end 23a of each wheelhouse 23, the side air guide part 31 extending to the vicinity of an end of the vehicle 11 in the vehicle width direction.

According to the undercover structure according to the sixth aspect, the first cover part 15a has the side air guide part 31 provided ahead of the front end 23a of each wheelhouse 23, the side air guide part 31 extending to the vicinity of an end of the vehicle 11 in the vehicle width direction, so that an effect of making the airflow between a road and a vehicle in each wheelhouse 23 less turbulent to increase a negative pressure generated by the airflow between a road and a vehicle and regulate the flow rate of the airflow between a road and a vehicle can be increased as compared with the undercover structure according to the fifth aspect.

Further, an undercover structure according to a seventh aspect is based on the undercover structure according to the sixth aspect and may employ a structure where the curved part 27 with a predetermined curvature is formed at the lowermost part of the side air guide part 31 in the side view.

According to the undercover structure according to the seventh aspect, the curved part 27 with a predetermined curvature is formed at the lowermost part of the side air guide part 31 in the side view, so that an effect of making the airflow between a road and a vehicle in each wheelhouse 23 less turbulent to increase a negative pressure generated by the airflow between a road and a vehicle and bring the flow rate of the airflow between a road and a vehicle to reasonable levels as compared with the undercover structure according to the sixth aspect can be obtained.

Further, an undercover structure according to an eighth aspect is based on the undercover structure according to the sixth or seventh aspect and may employ a structure where the side air guide part 31 is provided integrally with the first cover part 15a of the undercover 15.

According to the undercover structure according to the eighth aspect, the side air guide part 31 is provided integrally with the first cover part 15a of the undercover 15, so that an effect of increasing a negative pressure generated by the airflow between a road and a vehicle derived from the side air guide part 31 and regulating the flow rate of the airflow between a road and a vehicle can be expected with a relatively simple structure.

Further, an undercover structure according to a ninth aspect is based on the undercover structure according to any one of the second to eighth aspects and may employ a structure where the first cover part 15a of the undercover 15 has the first front end 15a1 supported in contact with the vicinity of the front lower end of the front bumper 18.

According to the undercover structure according to the ninth aspect, the first cover part 15a of the undercover 15 has the first front end 15a1 supported in contact with the vicinity of the front lower end of the front bumper 18, so that it is possible to straighten the airflow between a road and a vehicle at a generation introduction part where the airflow between a road and a vehicle is generated first. This allows the undercover structure to acquire traveling stability, steering stability, and comfort of the vehicle at a high level.

Further, an undercover structure according to a tenth aspect is based on the undercover structure according to any one of the first to ninth aspects and employs a structure where the undercover 15 is supported movable in the up-down direction relative to the vehicle body 13 of the vehicle 11 (a direction toward or away from the bottom surface of the vehicle body 13).

According to the undercover structure according to the tenth aspect, the undercover 15 is supported movable in the up-down direction relative to the vehicle body 13 of the vehicle 11, so that an operation for further increasing traveling stability, steering stability, and comfort of the vehicle can be made by increasing a degree of deployment of the undercover 15 when the vehicle 11 travels at a high speed, for example.

Further, an undercover structure according to an eleventh aspect is based on the undercover structure according to the tenth aspect and employs a structure where the undercover 15 is movably supported by the actuator 20.

According to the undercover structure according to the eleventh aspect, the undercover 15 is movably supported by the actuator 20, so that an operation for further increasing traveling stability, steering stability, and comfort of the vehicle can be suitably made by increasing a degree of deployment of the undercover 15 during high-speed traveling, for example.

OTHER EMBODIMENT

The plurality of embodiments described above are examples of implementation of the present invention. Therefore, the embodiments should not be construed as limiting the technical scope of the present invention. This is because the present invention can be implemented in various forms without departing from the gist or main features of the present invention.

What is claimed is:

1. An undercover structure comprising an undercover provided on a vehicle body of a vehicle to cover a lower part of the vehicle body, wherein
   the undercover has a lowermost part positioned ahead of a front wheel axle,
   a curved part with a predetermined curvature is formed at the lowermost part of the undercover in a side view,
   a front end of the undercover in a front-rear direction of the undercover is positioned higher than a rear end of the undercover in the front-rear direction of the undercover, and
   the undercover structure further comprises a deployment suppression part formed around the curved part located near a center of the undercover in a vehicle width direction, wherein the deployment suppression part suppresses deployment of a part of the undercover in such a manner that the undercover is deployed into a substantially inverted V shape in a front view when the undercover is deployed.

2. The undercover structure according to claim 1, wherein the undercover includes a first cover part disposed at a front side of the lower part of the vehicle body of the vehicle and a second cover part disposed at a rear side of the first cover part to extend rearward,
   the first cover part of the undercover has a first front end provided on the vehicle body and positioned higher than a first rear end of the first cover part, and
   the curved part is formed on the first cover part and the second cover part in such a manner that the curved part bestrides the first cover part and the second cover part.

3. The undercover structure according to claim 2, wherein the second cover part of the undercover has a second rear end provided on the vehicle body.

4. The undercover structure according to claim 2, wherein the first cover part extends for a width nearly equal to a vehicle width of the vehicle.

5. The undercover structure according to claim 2, wherein the undercover has the lowermost part positioned near a front end of a wheelhouse.

6. The undercover structure according to claim 5, wherein the first cover part has a side air guide part provided ahead of the front end of the wheelhouse, the side air guide part extending to a vicinity of an outer edge of the vehicle in a vehicle width direction.

7. The undercover structure according to claim 6, wherein a curved part with a predetermined curvature is formed at a lowermost part of the side air guide part in the side view.

8. The undercover structure according to claim 6, wherein the side air guide part is provided integrally with the first cover part of the undercover.

9. The undercover structure according to claim 2, wherein the first cover part of the undercover has the first front end supported in contact with a vicinity of a front lower end of a front bumper.

10. The undercover structure according to claim 1, wherein
    the undercover is supported movable in an up-down direction relative to the vehicle body of the vehicle.

11. The undercover structure according to claim 10, wherein
    the undercover is movably supported by an actuator.

12. The undercover structure according to claim 1, wherein
    a restraining member configured to restrain and suppress the deployment of the undercover is provided at a part of the curved part located at the center of the undercover in the vehicle width direction, and
    the restraining member has one end fixed to a member of a vehicle body and has the other end fixed to the part of the curved part located at the center of the undercover in the vehicle width direction.

* * * * *